United States Patent
Shin et al.

(10) Patent No.: US 8,731,279 B2
(45) Date of Patent: May 20, 2014

(54) METHOD AND DEVICE FOR GENERATING MULTI-VIEWPOINT IMAGE

(75) Inventors: Hong-Chang Shin, Seoul (KR); Gun Bang, Daejeon-si (KR); Gi-Mun Um, Daejeon-si (KR); Tae One Kim, Daejeon-si (KR); Eun Young Chang, Daejeon-si (KR); Nam Ho Hur, Daejeon-si (KR); Soo In Lee, Daejeon-si (KR)

(73) Assignee: Electronics and Telecommunications Research Institute, Daejeon-si (KR)

( * ) Notice: Subject to any disclaimer, the term of this patent is extended or adjusted under 35 U.S.C. 154(b) by 159 days.

(21) Appl. No.: 13/314,872

(22) Filed: Dec. 8, 2011

(65) Prior Publication Data

US 2012/0148173 A1 Jun. 14, 2012

(30) Foreign Application Priority Data

Dec. 8, 2010 (KR) .......................... 10-2010-0125188

(51) Int. Cl.
*G06K 9/00* (2006.01)
*G06K 9/32* (2006.01)
*H04N 13/00* (2006.01)

(52) U.S. Cl.
USPC .............................. 382/154; 382/300; 348/42

(58) Field of Classification Search
CPC ..................... H04N 2213/003; H04N 13/0217
USPC ............ 382/154, 284–294, 298–300; 348/43, 348/49, 222.1, 340, 344, E13.074, E5.024; 345/419, 606, 607, 613, 633
See application file for complete search history.

(56) References Cited

U.S. PATENT DOCUMENTS

| 6,011,581 | A  | * | 1/2000  | Swift et al. ...................... 348/58 |
| 6,556,236 | B1 | * | 4/2003  | Swift et al. ...................... 348/56 |
| 2007/0285554 | A1 | * | 12/2007 | Givon .......................... 348/340 |
| 2010/0194862 | A1 | * | 8/2010  | Givon ............................ 348/49 |
| 2011/0026809 | A1 | * | 2/2011  | Jeong et al. .................... 382/154 |
| 2011/0080496 | A1 | * | 4/2011  | Givon ........................ 348/222.1 |
| 2012/0069146 | A1 | * | 3/2012  | Lee et al. ........................ 348/43 |

OTHER PUBLICATIONS

Chen, E. and Williams, L. 1993. View interpolation for image synthesis. In SIGGRAPH, pp. 279-288.*
Oh, et al., "Disparity Estimation and Virtual View Synthesis from Stereo Video" 2007 IEEE International Symposium on Circuits and Systems, p. 4, published in 2006 in USA.*
Xin Li, "Symmetric Disparity Estimation in Distributed Coding of Stereo Images," Image Processing, 2006 IEEE International Conference on , vol., No., pp. 589,592, Oct. 8-11, 2006.*
Lim et al, Simultaneous intermediate-view interpolation and multiplexing algorithm for a fast lenticular display, Optical Engineering 4611, 114003 Nov. 2007.*

* cited by examiner

*Primary Examiner* — Andrae S Allison
(74) *Attorney, Agent, or Firm* — H.C. Park & Associates, PLC

(57) ABSTRACT

Method and device for generating a multi-viewpoint image are provided. The method of generating a multi-viewpoint image includes the steps of: acquiring at least one reference-viewpoint image; generating unit image information of a virtual-viewpoint image on the basis of unit image information of the reference-viewpoint image; multiplexing the unit image information of the reference-viewpoint image and the unit image information of the virtual-viewpoint image; and generating a multi-viewpoint image by performing an interpolation process on occluded areas between the multiplexed unit image information using the multiplexed unit image information. As a result, it is possible to avoid unnecessary processes of completing and rearranging individual viewpoint images in the course of generating a multi-viewpoint image.

19 Claims, 6 Drawing Sheets

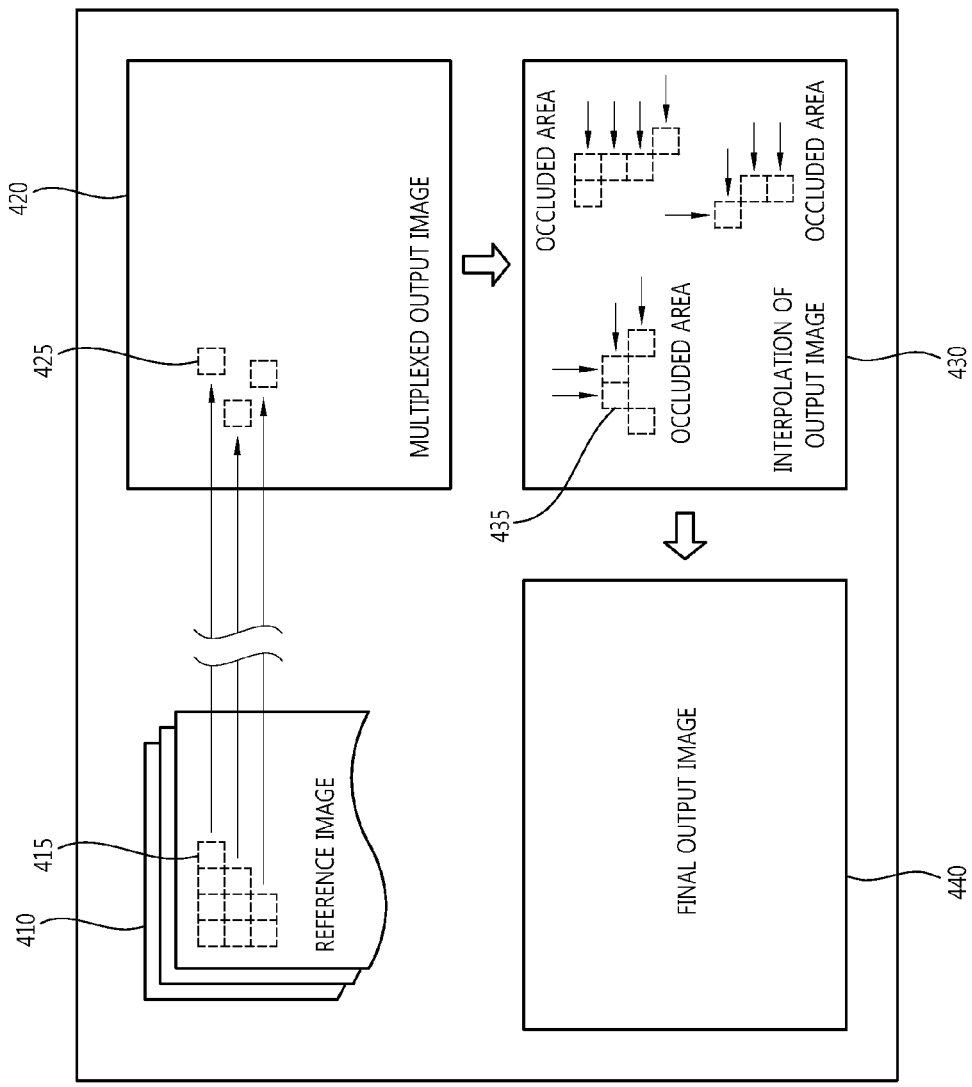

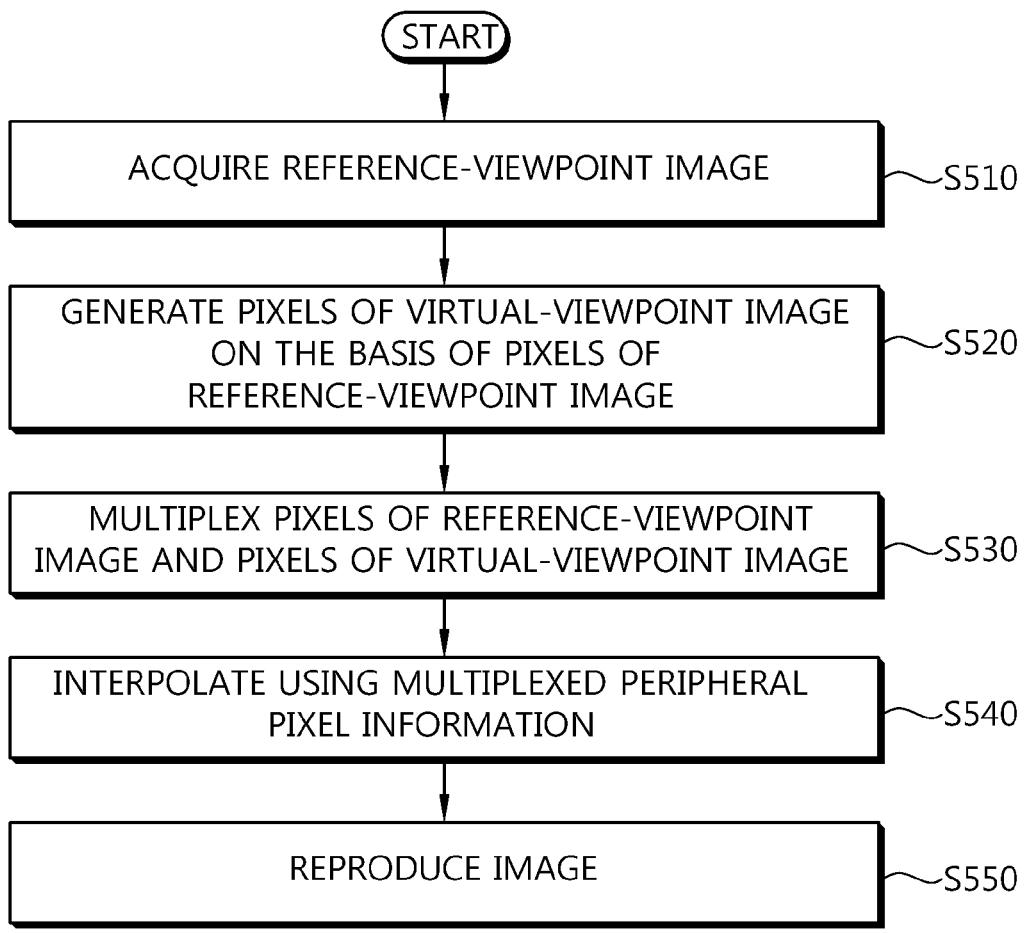

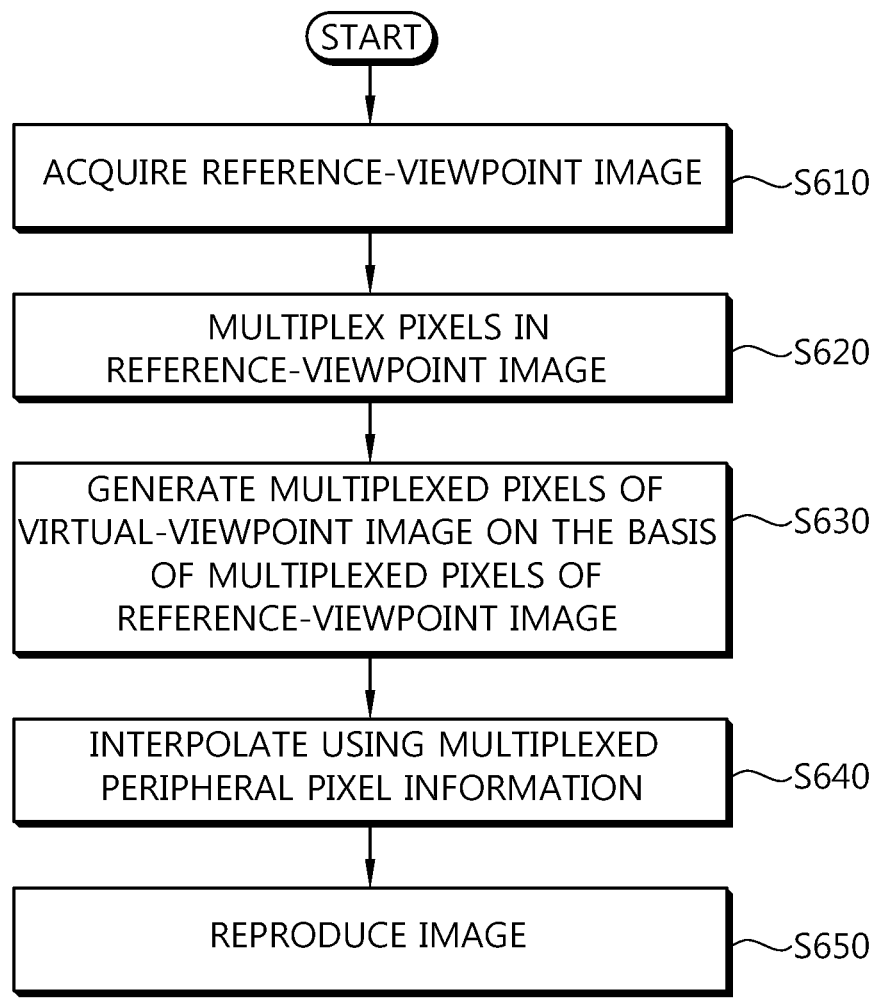

METHOD AND DEVICE FOR GENERATING MULTI-VIEWPOINT IMAGE

CROSS-REFERENCE TO RELATED APPLICATIONS

This application claims the benefit of priority of Korean Patent Application No. 10-2010-0125188 filed on Dec. 8, 2010, which is incorporated by reference in their entirety herein.

BACKGROUND

1. Field of the Invention

The present invention relates to an image processing technique, and more particularly, to a technique of multiplexing a multi-viewpoint image with plural viewpoints to allow a multi-viewpoint three-dimensional display to generate and to reproduce the multi-viewpoint image.

2. Description of the Related Art

A three-dimensional display provides viewers with a stereoscopic effect by simultaneously giving two-dimensional images with two or more viewpoints, in which a disparity in viewpoint basically exists, to viewer's eyes.

A multi-view or multi-viewpoint image is an image including two-dimensional images with plural viewpoints and providing three-dimensional visual information and can be displayed by a three-dimensional display.

SUMMARY

An advantage of some aspects of the invention is that it provides a method and a device capable of avoiding unnecessary processes of completing and rearranging individual-viewpoint images in the course of generating a multi-viewpoint image.

Another advantage of some aspects of the invention is that it provides direct view multiplexing method and device capable of performing a process of directly multiplexing individual pixels or sub pixels of which positions in a virtual-viewpoint image are calculated by a view synthesis method on the individual pixels or sub pixels in a reference-viewpoint image.

Still another advantage of some aspects of the invention is that it provides a method capable of directly affecting image quality or a stereoscopic effect recognized by a viewer by performing an interpolation process suitable for a structure and characteristics of an output device in a stage of outputting a final image.

According to an aspect of the invention, there is provided a method of generating a multi-viewpoint image including the steps of: acquiring at least one reference-viewpoint image; generating unit image information (it can also be called as 'information pieces') of a virtual-viewpoint image on the basis of unit image information of the reference-viewpoint image; multiplexing the unit image information of the reference-viewpoint image and the unit image information of the virtual-viewpoint image; and generating a multi-viewpoint image by performing an interpolation process on occluded areas between the multiplexed unit image information using the multiplexed unit image information.

The interpolation process on the occluded areas may be performed using information of the unit image information adjacent to the occluded areas.

The unit image information of the virtual-viewpoint image may be generated on the basis of the unit image information of the reference-viewpoint image, and the generated unit image information of the virtual-viewpoint image may have different viewpoints.

The unit image information of the virtual-viewpoint image may be multiplexed in a space of the multi-viewpoint image in which the unit image information of the reference-viewpoint image used to generate the unit image information of the virtual-viewpoint image are multiplexed.

Depth priorities of images corresponding to the multiplexed unit image information may be determined on the basis of geometric information of the multiplexed unit image information.

The unit image information may be image information of pixels or image information of sub pixels.

According to another aspect of the invention, there is provided a multi-viewpoint image generating method including the steps of: acquiring at least one reference-viewpoint image; multiplexing unit image information of the reference-viewpoint image; generating multiplexed unit image information on the basis of the multiplexed unit image information of the reference-viewpoint image; and generating a multi-viewpoint image by performing an interpolation process on occluded areas between the multiplexed unit image information using the multiplexed unit image information.

The interpolation process on the occluded areas may be performed using information of the unit image information adjacent to the occluded areas.

The unit image information of the virtual-viewpoint image may be generated on the basis of the unit image information of the reference-viewpoint image, and the generated unit image information of the virtual-viewpoint image may have different viewpoints.

The unit image information of the virtual-viewpoint image may be multiplexed in a space of the multi-viewpoint image in which the unit image information of the reference-viewpoint image used to generate the unit image information of the virtual-viewpoint image are multiplexed.

Depth information of the unit image information of the virtual-viewpoint image may be determined on the basis of geometric information of the unit image information of the reference-viewpoint image and position information on positions at which the unit image information of the virtual-viewpoint image should be multiplexed.

Geometric information of images corresponding to the unit image information of the virtual-viewpoint image may be determined on the basis of geometric information of images corresponding to the unit image information of the reference-viewpoint image and position information on positions at which the unit image information of the virtual-viewpoint image should be multiplexed.

The unit image information may be image information of pixels or image information of sub pixels.

According to still another aspect of the invention, there is provided a multi-viewpoint image generating device including: an image input unit that acquires a reference-viewpoint image; an image output unit that outputs a multi-viewpoint image; and an image generating unit that generates the multi-viewpoint image on the basis of the reference-viewpoint image. Here, the image generating unit includes: a virtual-viewpoint image generator that generates unit image information of a virtual-viewpoint image on the basis of unit image information of the reference-viewpoint image; a multiplexer that gives the unit image information of the viewpoint images information on a space in which the unit image information of the viewpoint images are arranged in an output image of the image output unit and multiplexing the unit image information of the viewpoint images; and an interpolator that performs an interpolation process on occluded areas between the multiplexed unit image information of the reference-viewpoint image and the multiplexed unit image information of the virtual-viewpoint image.

The multiplexer may multiplex the unit image information of the reference-viewpoint image acquired by the image input unit and the unit image information of the virtual-viewpoint image generated by the virtual-viewpoint image generator.

The multiplexer may multiplex the unit image information of the reference-viewpoint image, and the virtual-viewpoint image generator may generate the multiplexed unit image information of the virtual-viewpoint image having information on a space in the output image of the image output unit on the basis of the multiplexed unit image information of the reference-viewpoint image.

The unit image information may be image information of pixels or image information of sub pixels.

According to the above-mentioned configurations, it is possible to avoid unnecessary steps of completing and rearranging individual-viewpoint images in the course of generating a multi-viewpoint image.

It is also possible to perform a process of directly multiplexing individual pixels or sub pixels of which positions in a virtual-viewpoint image are calculated by a view synthesis method on the individual pixels or sub pixels in a reference-viewpoint image.

It is also possible to directly affect image quality or a stereoscopic effect recognized by a viewer by performing an interpolation process suitable for a structure and characteristics of an output device in a stage of outputting a final image.

BRIEF DESCRIPTION OF THE DRAWINGS

FIG. 4 is a diagram schematically illustrating a method of generating and outputting a multi-viewpoint image at the pixel level according to an embodiment of the invention.

FIG. 5 is a flow diagram schematically illustrating an example of a method of generating a multi-viewpoint image used in the invention.

FIG. 6 is a flow diagram schematically illustrating another example of a method of generating a multi-viewpoint image used in the invention.

DESCRIPTION OF EXEMPLARY EMBODIMENTS

Figure 1:
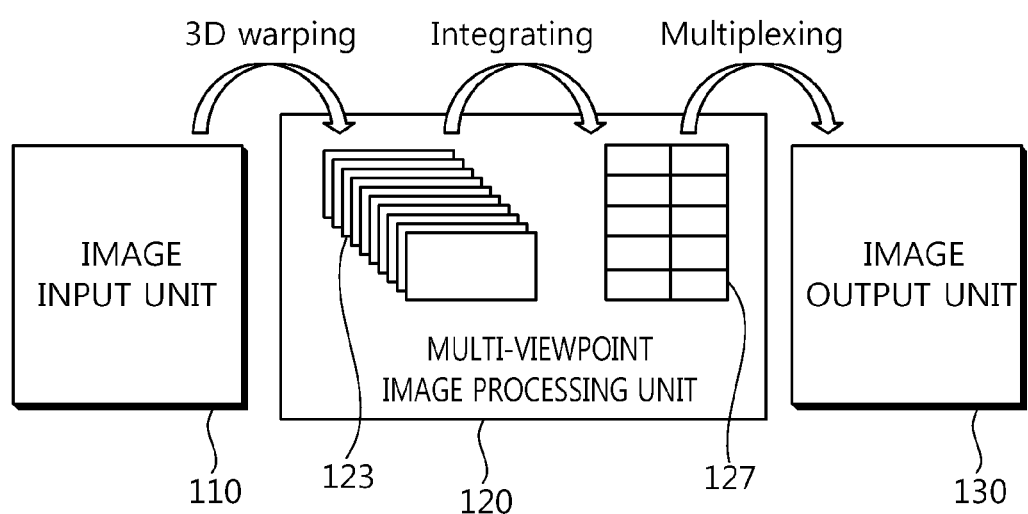
FIG. 1 is a diagram schematically illustrating generation of a multi-viewpoint image by view synthesis.

Hereinafter, exemplary embodiments of the invention will be described in detail with reference to the accompanying drawings. It should be noted in referencing elements in the drawings that like elements are referenced by like reference numerals as much as possible even if they are shown in different drawings. When it is determined in describing embodiments of the invention that specific description of known configurations or functions makes the concept of the invention vague, detailed description thereof will not be made.

Terms, "first", "second", "A", "B", "(a)", and "(b)", can be used to explain elements in this specification. Such terms are intended only to distinguish one element from another element, and the nature, sequence, or order of the corresponding elements are not limited by the terms. If it is described that an element is "linked", "coupled", or "connected" to another element, it should be understood that the element may be connected or linked directly to another element or still another element may be interposed therebetween.

In addition, the description, "including a specific configuration", in the invention means that it does not exclude any configuration other than the specific configuration but any additional configuration may be included in the embodiments of the invention or the technical spirit of the invention.

In a representative method of generating a multi-viewpoint image, view synthesis is performed using various reference-viewpoint images captured by one or more cameras and geometric information of the reference-viewpoint images, for example, depth information of a depth image giving a depth effect.

HG. 1 is a diagram schematically illustrating generating of a multi-viewpoint image by view synthesis.

The view synthesis is basically to generate a virtual-viewpoint image on the basis of pixel values of a reference-viewpoint image acquired by an image input unit 110 such as a camera and geometric information corresponding to the pixels. Here, the reference-viewpoint image is an image acquired by a camera and the virtual-viewpoint image is an image generated on the basis of the reference-viewpoint image with a viewpoint different from that of the reference-viewpoint image.

More specifically, a multi-viewpoint image processing unit 120 calculates pixel values and position values of pixels of a virtual-viewpoint image corresponding to the pixels of the reference-viewpoint image to generate the virtual-viewpoint image using the pixels of the reference-viewpoint image and the geometric information corresponding to the pixel values, for example, camera calibration information or depth information of the pixels.

The multi-viewpoint image processing unit 120 arranges or constitutes the reference-viewpoint image and the virtual-viewpoint image generated through the use of view synthesis, that is, viewpoint images 123, in accordance with an input format 127 required for a multi-viewpoint display.

The image output unit 130 is a multi-viewpoint display. The image output unit 130 rearranges the viewpoint images input in accordance with the input format 127 so as to correspond to a display pixel arrangement of the image output unit, which is called multiplexing.

The multiplexing in this specification includes determining at what coordinates in the display of the image output unit outputting a multi-viewpoint image the pixels should be arranged on the basis of the pixel arrangement of the display (for example, allocating space information on the final output display to the pixels of the viewpoint images) or arranging the pixels of the viewpoint images in accordance therewith.

The multiplexing in the multi-viewpoint display should be performed because it is necessary to physically divide a space of a display panel and to simultaneously provide various viewpoint images to human eyes so as to give a three-dimensional effect to the human eyes using various viewpoint images having a disparity in viewpoint.

The image output unit 130 outputs a final multi-viewpoint image based on the multiplexed viewpoint images.

Figure 2:
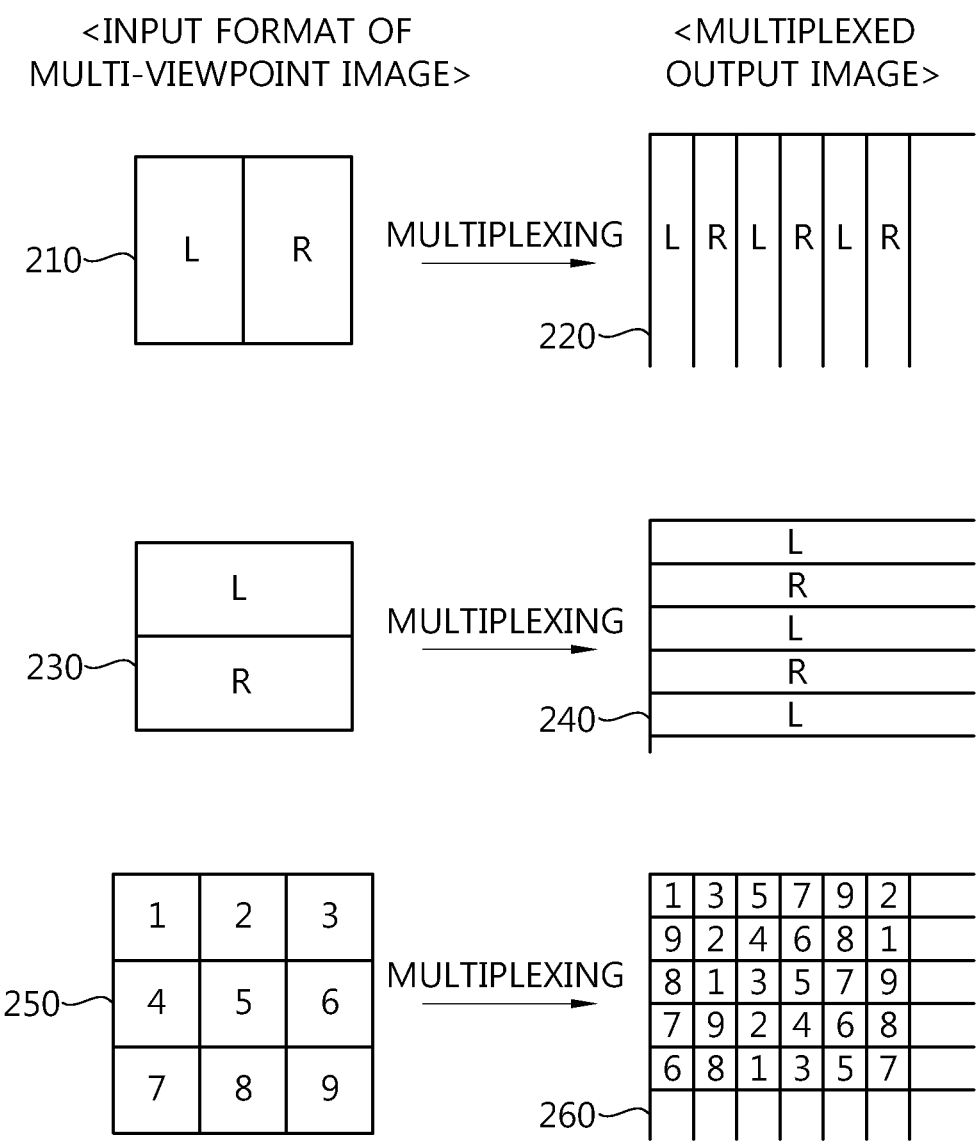
FIG. 2 is a diagram schematically illustrating a method of generating a multi-viewpoint image and including a multiplexing process.

FIG. 2 is a diagram schematically illustrating an example of the method of generating a multi-viewpoint image and including a multiplexing process.

Reference numerals 210 to 240 in FIG. 2 illustrate exemplary multiplexing methods in a stereoscopic display receiving two viewpoint images.

When two viewpoint images are input in a side-by-side format in accordance with the input format of a multi-viewpoint display (stereoscopic display (210), the multi-viewpoint display multiplexes the viewpoint images by interlacing the viewpoint images column by column and outputs the resultant two-viewpoint image (220).

When two viewpoint images are input in a top-bottom format in accordance with the input format of the multi-viewpoint display (stereoscopic display) (23), the multi-viewpoint image multiplexes and outputs the viewpoint images by interlacing the viewpoint images row by row and outputs the resultant two-viewpoint image (240).

Reference numerals 250 and 260 illustrate an exemplary multiplexing method in a multi-viewpoint display (stereoscopic display) receiving nine viewpoint images.

The nine viewpoint images are arranged in accordance with the input format of the multi-viewpoint display. The format in which the nine viewpoint images are arranged in a 3×3 lattice structure can be changed depending on the input format required for the multi-viewpoint display.

When the multi-viewpoint images arranged in accordance with the input format required for the multi-viewpoint image are input, the multi-viewpoint image multiplexes the viewpoint images pixel by pixel or sub pixel by sub pixel.

Unit image information such as pixels or sub pixels of the viewpoint images to which information on the spatial arrangement on the display panel is allocated by multiplexing are divided by viewpoints depending on a driving method of the display panel or a physical structure such as a lenticular lens or a parallax barrier disposed above or below the display panel and are then output.

The multiplexing method can be changed depending on the physical structure or the driving method of the image output unit, that is, the multi-viewpoint display.

As shown in FIG. 1, when the multi-viewpoint display sequentially generates images so as to reproduce a multi-viewpoint image, for example, when all the viewpoint images for generating the multi-viewpoint image are generated and then the multi-viewpoint image to finally be output is generated, it takes much time and a lot of image resources.

Figure 3:
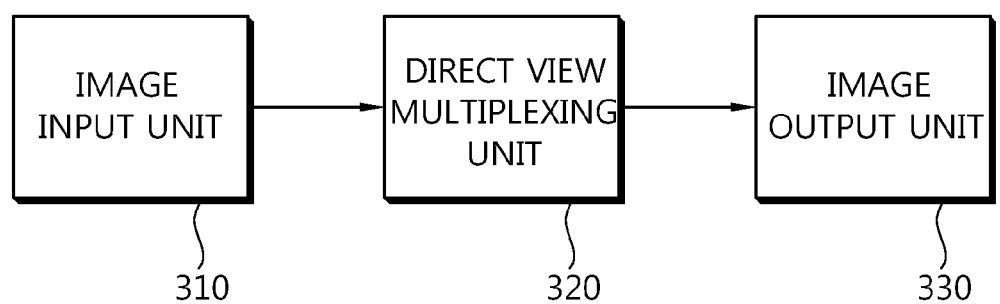
FIG. 3 is a diagram schematically illustrating a direct view multiplexing method used in the invention.

FIG. 3 is a diagram schematically illustrating a direct view multiplexing method used in the invention.

Reference-viewpoint images and geometric information of the reference-viewpoint images necessary for generating a multi-viewpoint image are input to an image input unit 310.

In the example shown in FIG. 1, the multi-viewpoint image processing unit 120 generates the virtual-viewpoint images by the number of viewpoints required for the display using the reference-viewpoint images and the geometric information.

In the example shown in FIG. 3, without going through the intermediate step of generating individual virtual-viewpoint images, a direct view multiplexing unit 320 directly multiplexes unit image information, that is, pixels or partial pixels of the reference-viewpoint images and pixels or sub pixels mapped onto virtual viewpoints at the pixel or sub pixel level. The unit image information directly multiplexed at the pixel or sub pixel level are directly mapped onto the final output image, that is, the multi-viewpoint image, of the multi-viewpoint display.

Accordingly, in the example shown in FIG. 3, the view synthesis is performed at the multiplexed image level, that is, at the output image level and the multiplexing is also performed at the unit image information level, that is, at the pixel or sub pixel level. For example, the processes such as mapping process (3D warping) or a depth priority determining process (Z-buffering) using three-dimensional geometric information in the course of view synthesis are performed at the final output image level of the multi-viewpoint display, that is, at the multiplexed unit image information level.

FIG. 4 is a diagram schematically illustrating a method of generating and outputting a multi-viewpoint image at the pixel level according to an embodiment of the invention.

Individual pixels 415 of reference-viewpoint images 410 having three-dimensional geometric information are directly mapped onto a final output image 420 through the use of the view synthesis process and the multiplexing process or the multiplexing process and the view synthesis process. Corresponding pixels of virtual-viewpoint images are generated on the basis of the individual pixels 415 of the reference-viewpoint images 410 and the individual pixels of the reference-viewpoint images and the individual pixels of the virtual-viewpoint images are multiplexed.

Alternatively, the individual pixels 415 of the reference-viewpoint images 410 may be multiplexed and then the corresponding pixels of the virtual-viewpoint images may be generated on the basis of the multiplexed pixels. In this case, the generated pixels of the virtual-viewpoint images have been multiplexed. That is, in state where the individual pixels of the reference-viewpoint images are multiplexed and have space information on at what positions in the final multi-viewpoint image the pixels should be arranged, the pixels of the virtual-viewpoint images generated on the basis of the individual pixels of the reference-viewpoint images and the space information thereof have the same space information on arrangement on the final multi-viewpoint image. That is, the generated pixels of the virtual-viewpoint images have been multiplexed.

An occluded area (or hole) 435 not visible in the reference-viewpoint images but visible only in the virtual-viewpoint images is formed in the multi-viewpoint image 430 in which the pixels are arranged by viewpoints through the multiplexing. The occluded area is an area which is not visible in the reference-viewpoint images, that is, an area of which information does not exist in the reference-viewpoint image.

Accordingly, an interpolation process is performed on the basis of information on areas having the highest similarity to the occluded area in the reference-viewpoint images or the virtual-viewpoint images. The area having the highest similarity to the occluded area 435 is mainly a peripheral area of the occluded area.

In the example shown in FIG. 1, the interpolation process is performed in the course of generating the virtual-viewpoint images. That is, the interpolation process has to be performed on the same occluded area whenever each virtual-viewpoint image is generated. Therefore, the same interpolation process is repeatedly performed every individual virtual-viewpoint image.

In the example shown in FIG. 3, since the interpolation process is performed using the image information of the peripheral area at the level of multi-viewpoint image which is multiplexed at the unit image information level, that is, at the pixel or sub pixel level, the interpolation process may be performed only once on the same occluded area in a multi-viewpoint image.

In the multiplexing structure of the multi-viewpoint display, individual pixels or sub pixels of neighboring viewpoint images have a spatial locality. Regarding the occluded area, the occluded areas of the virtual-viewpoint images have the spatial locality. That is, the individual pixels or sub pixels of the viewpoint images spatially adjacent to each other have image information similar to those of the occluded areas.

Therefore, the occluded areas can be subjected to the interpolation process using the information of the adjacent viewpoint images having high similarity on the basis of the spatial locality. At this time, since the multiplexing method or structure can vary depending on the multi-viewpoint displays, the specific interpolation method can also vary depending on the multiplexing structure.

According to the invention, since the interpolation process is performed at the level of a multi-viewpoint image finally output, it is possible to reduce the number of interpolation times and to perform the interpolation process suitable for the structure or characteristic of the multi-viewpoint display. Therefore, it is possible to perform the interpolation process so as to directly affect the image quality and the stereoscopic effect felt by a viewer.

After the interpolation process is performed at the multiplexed multi-viewpoint image level, the final multi-viewpoint image 440 is generated and is output to the multi-viewpoint display.

FIG. 5 is a flow diagram schematically illustrating an example of a method of generating a multi-viewpoint image used in the invention.

In order to generate a multi-viewpoint image, reference-viewpoint images are acquired by the use of one or more cameras (S510). A camera or an image input device acquires three-dimensional geometric information of the reference-viewpoint images together. The three-dimensional geometric information includes visual information such as depth information of the corresponding images.

Pixels of virtual-viewpoint images are generated on the basis of the pixels of the reference-viewpoint images (S520). Here, for the purpose of convenient explanation, it is assumed that the image information is processed at the pixel level, but sub pixels of the virtual-viewpoint images may be generated on the basis of the sub pixels of the reference-viewpoint images and the sub pixels may be set as unit image information to be processed to generate a multi-viewpoint image.

The pixels of the reference-viewpoint images and the pixels of the virtual-viewpoint images are multiplexed (S530). The multiplexing method can vary depending on the structure or characteristic of the image output device, that is, the multi-viewpoint display. Information on an arrangement space in the multi-viewpoint image to finally be output can be allocated to the pixels of the viewpoint images through the multiplexing.

The interpolation process is performed using the multiplexed peripheral pixel information (S540). When the information on the arrangement space in the final multi-viewpoint image is allocated through the multiplexing, the occluded area in the multi-viewpoint image can be determined and the spatial locality on the pixels of the viewpoint images can be determined.

Accordingly, it is possible to perform the interpolation process on the occluded area on the basis of the spatial locality. As described above, since the interpolation process is performed at the final multi-viewpoint image level, the interpolation process is not repeatedly performed on the same occluded area, but can be performed in a way optimized for the multi-viewpoint display.

When the interpolation process is finished, the final multi-viewpoint image is output (S550).

FIG. 6 is a flow diagram schematically illustrating another example of a method of generating a multi-viewpoint image used in the invention.

In order to generate a multi-viewpoint image, reference-viewpoint images are acquired by the use of one or more cameras (S610). A camera or an image input device acquires three-dimensional geometric information of the reference-viewpoint images together. The three-dimensional geometric information includes visual information such as depth information of the corresponding images.

Pixels of the reference-viewpoint images are multiplexed (S620). Here, for the purpose of convenient explanation, it is assumed that the image information is processed at the pixel level, but sub pixels of the virtual-viewpoint images may be set as unit image information to be processed to generate a multi-viewpoint image.

The multiplexing method can vary depending on the structure or characteristic of the image output device, that is, the multi-viewpoint display. Information on an arrangement space in the multi-viewpoint image to finally be output can be allocated to the pixels of the reference-viewpoint images through the multiplexing.

Multiplexed pixels of virtual-viewpoint images are generated on the basis of the multiplexed pixels of the reference-viewpoint images (S630). In this case, the pixels of the virtual-viewpoint images can be generated using space information of the multiplexed reference-viewpoint images together. That is, the pixels of the virtual-viewpoint images can be generated in consideration of the positions which are spatially arranged in the multi-viewpoint image to finally be output. Accordingly, the generated pixels of the virtual-viewpoint images have spatial arrangement information in the final multi-viewpoint image which is given through the multiplexing.

The interpolation process is performed using the multiplexed peripheral pixel information (S640). Since the pixels of the reference-viewpoint images and the pixels of the virtual-viewpoint images have the arrangement space information in the final multi-viewpoint image, the occluded area in the multi-viewpoint image can be determined and the spatial locality of the pixels of the viewpoint images can be determined.

Therefore, it is possible to perform the interpolation process on the occluded area on the basis of the spatial locality. As described above, since the interpolation process is performed at the final multi-viewpoint image level, the interpolation process is not repeatedly performed on the same occluded area, but can be performed in a way optimized for the multi-viewpoint display.

When the interpolation process is finished, the final multi-viewpoint image is output (S650).

Although methods have been described as a series of steps or blocks with reference to the flowcharts in the above-mentioned system, the invention is not limited to the sequence of steps but a certain step may be performed at different times from or at the same time as another step. It will be understood by a person skilled in the art that the steps shown in the flowcharts are not exclusive but may include another step, or one or more steps in the flowcharts can be deleted without affecting the scope of the invention.

The above-mentioned embodiments may include various modifications. All possible combinations of the modifications cannot be described, but it will be understood by a person skilled in the art that other combinations may be possible. Therefore, it should be understood that the invention includes all alternations, modifications, and changes belonging to the appended claims.

What is claimed is:
1. A method of generating a multi-viewpoint image, the method comprising:
acquiring at least one reference-viewpoint image;
generating unit image information of a virtual-viewpoint image on the basis of unit image information of the at least one reference-viewpoint image, the unit image information of the virtual-viewpoint image being generated without generating intermediate virtual viewpoint images;

multiplexing the unit image information of the at least one reference-viewpoint image and the unit image information of the virtual-viewpoint image; and generating a multi-viewpoint image by performing an interpolation process on occluded areas between the multiplexed unit image information using the multiplexed unit image information.

2. The method according to claim 1, wherein the interpolation process on the occluded areas is performed using information of the unit image information adjacent to the occluded areas.

3. The method according to claim 1, wherein:
the unit image information of the virtual-viewpoint image is generated on the basis of the unit image information of the at least one reference-viewpoint image; and
wherein the generated unit image information of the virtual-viewpoint image comprises different viewpoints.

4. The method according to claim 1, wherein the unit image information of the virtual-viewpoint image is multiplexed in a space of the multi-viewpoint image in which the unit image information of the at least one reference-viewpoint image used to generate the unit image information of the virtual-viewpoint image is multiplexed.

5. The method according to claim 1, wherein depth priorities of images corresponding to the multiplexed unit image information are determined on the basis of geometric information of the multiplexed unit image information.

6. The method according to claim 1, wherein the unit image information comprises image information of pixels or image information of sub pixels.

7. A multi-viewpoint image generating method, comprising:
acquiring at least one reference-viewpoint image;
multiplexing unit image information of the at least one reference-viewpoint image;
generating multiplexed unit image information for a virtual-viewpoint image on the basis of the multiplexed unit image information of the at least one reference-viewpoint image; and
generating a multi-viewpoint image by performing an interpolation process on occluded areas between the multiplexed unit image information using the multiplexed unit image information.

8. The method according to claim 7, wherein the interpolation process on the occluded areas is performed using information of the unit image information adjacent to the occluded areas.

9. The method according to claim 7, wherein:
the unit image information of the virtual-viewpoint image is generated on the basis of the unit image information of the at least one reference-viewpoint image; and
the generated unit image information of the virtual-viewpoint image comprises different viewpoints.

10. The method according to claim 7, wherein the unit image information of the virtual-viewpoint image is multiplexed in a space of the multi-viewpoint image in which the unit image information of the at least one reference-viewpoint image used to generate the unit image information of the virtual-viewpoint image is multiplexed.

11. The method according to claim 7, wherein depth information of the unit image information of the virtual-viewpoint image is determined on the basis of geometric information of the unit image information of the at least one reference-viewpoint image and position information on positions at which the unit image information of the virtual-viewpoint image are to be multiplexed.

12. The method according to claim 7, wherein geometric information of images corresponding to the unit image information of the virtual-viewpoint image is determined on the basis of geometric information of images corresponding to the unit image information of the at least one reference-viewpoint image and position information on positions at which the unit image information of the virtual-viewpoint image are to be multiplexed.

13. The method according to claim 7, wherein the unit image information comprises image information of pixels or image information of sub pixels.

14. A multi-viewpoint image generating device comprising:
an image input unit configured to acquire a reference-viewpoint image;
an image output unit configured to output a multi-viewpoint image; and
an image generating unit configured to generate the multi-viewpoint image on the basis of the reference-viewpoint image,
wherein the image generating unit comprises:
a virtual-viewpoint image generator configured to generate unit image information of a virtual-viewpoint image on the basis of unit image information of the reference-viewpoint image, the virtual-viewpoint image generator being configured to generate the unit image information of the virtual-viewpoint image without generation of intermediate virtual-viewpoint images;
a multiplexer configured to allocate information on an arrangement space in the multi-viewpoint image to be output from the image output unit and to multiplex unit image information; and
an interpolator configured to perform an interpolation process on occluded areas between multiplexed unit image information of the reference-viewpoint image and multiplexed unit image information of the virtual-viewpoint image.

15. The device according to claim 14, wherein the multiplexer is configured to multiplex the unit image information of the reference-viewpoint image acquired by the image input unit and the unit image information of the virtual-viewpoint image generated by the virtual-viewpoint image generator.

16. The device according to claim 14, wherein:
the multiplexer is configured to multiplex the unit image information of the reference-viewpoint image; and
the virtual-viewpoint image generator is configured to generate the multiplexed unit image information of the virtual-viewpoint image with the information on the arrangement space in the multi-viewpoint image to be output from the image output unit on the basis of the multiplexed unit image information of the reference-viewpoint image.

17. The device according to claim 14, wherein the unit image information is image information of pixels or image information of sub pixels.

18. A non-transitory computer-readable medium comprising a program for instructing a computer to perform the method of claim 1.

19. A non-transitory computer-readable medium comprising a program for instructing a computer to perform the method of claim 7.

* * * * *